Feb. 23, 1965        F. PIERCE        3,170,655
HORIZON SCANNING METHOD FOR FIRING ROCKET STAGE
Filed Dec. 21, 1960        7 Sheets-Sheet 1

INVENTOR.
FIRTH PIERCE
BY P. H. Firth

ATTORNEYS.

INVENTOR.
FIRTH PIERCE

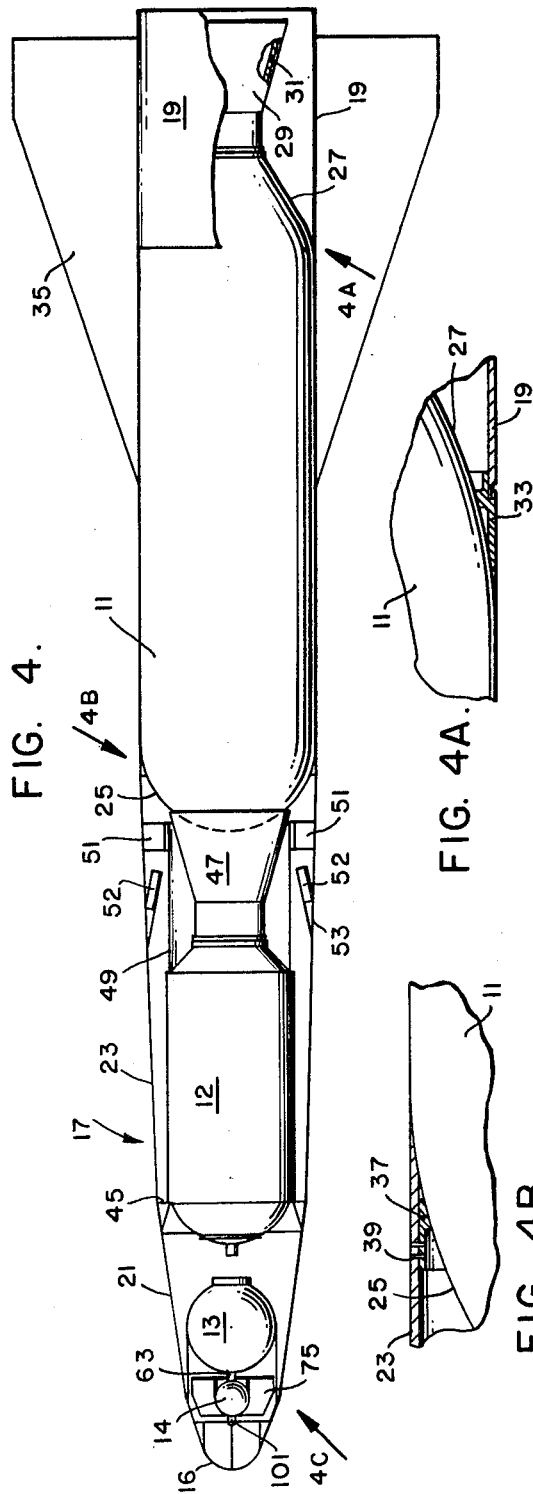
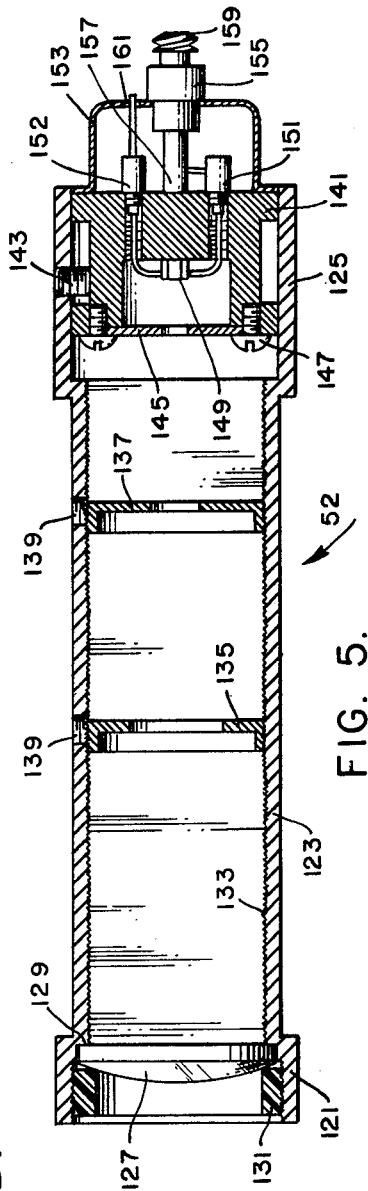

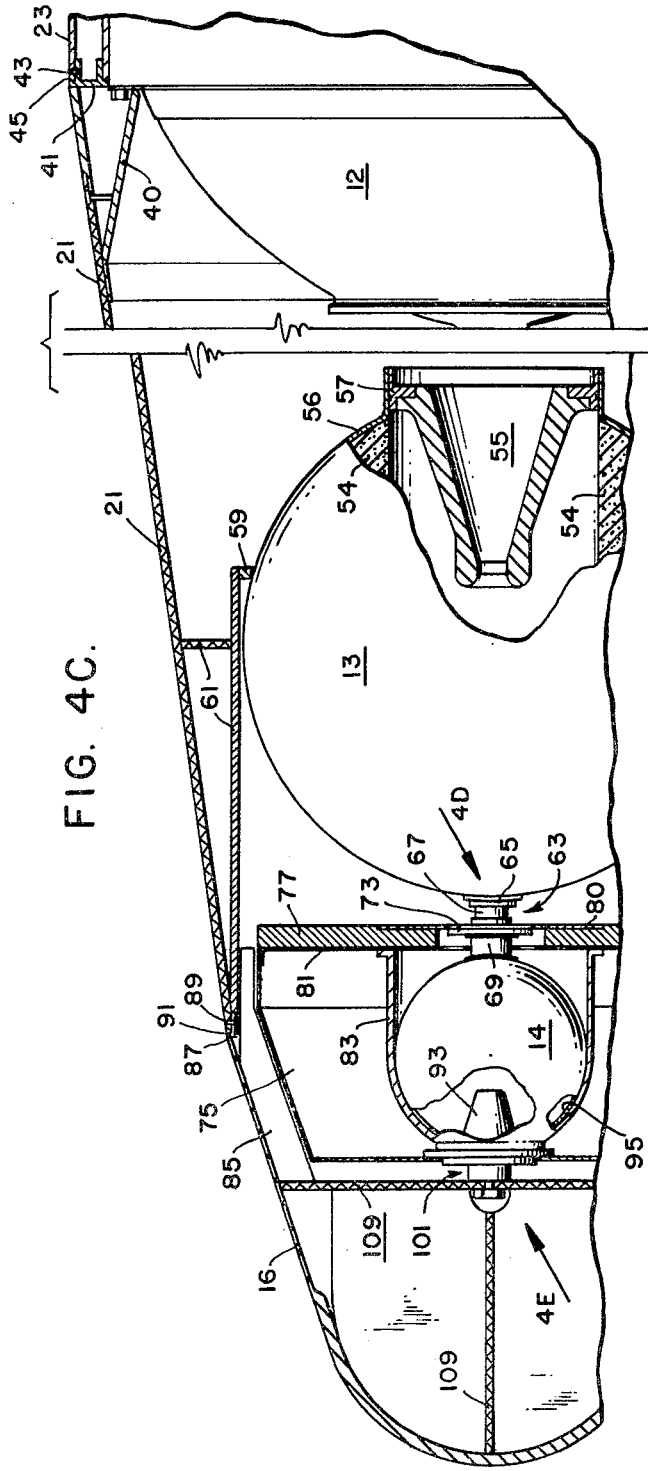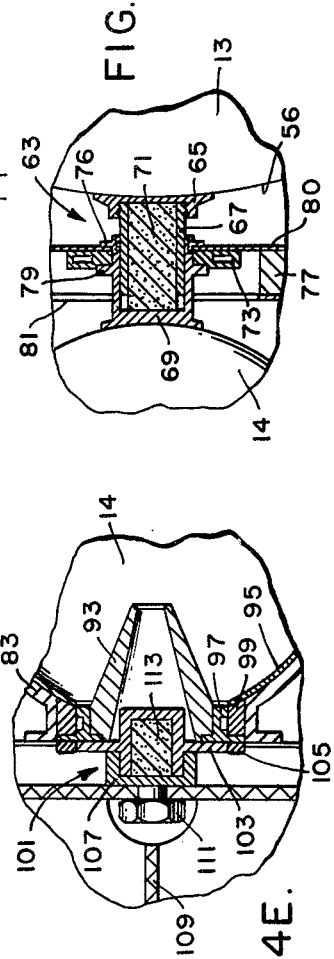

Feb. 23, 1965   F. PIERCE   3,170,655
HORIZON SCANNING METHOD FOR FIRING ROCKET STAGE
Filed Dec. 21, 1960   7 Sheets-Sheet 5

INVENTOR.
FIRTH PIERCE
BY P. H. Fisht
ATTORNEYS.

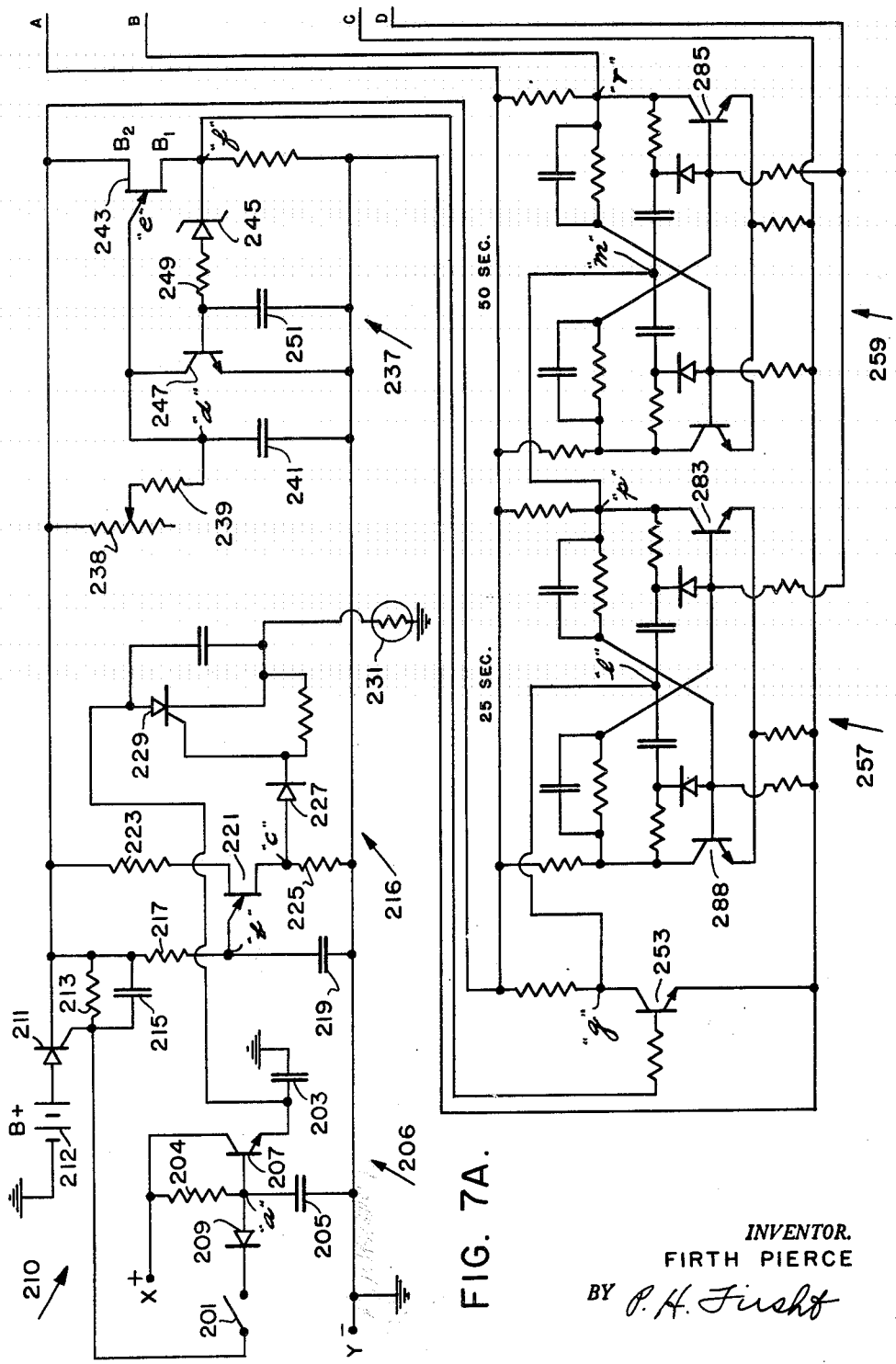

3,170,655
HORIZON SCANNING METHOD FOR FIRING ROCKET STAGE

Firth Pierce, China Lake, Calif., assignor to the United States of America as represented by the Secretary of the Navy
Filed Dec. 21, 1960, Ser. No. 77,478
7 Claims. (Cl. 244—14)
(Granted under Title 35, U.S. Code (1952), sec. 266)

The invention herein described may be manufactured and used by or for the Government of the United States of America for governmental purposes without the payment of any royalties thereon or therefor.

The present invention relates to a multistage rocket vehicle useful for launching a satellite to put a payload into orbit or for probing space; and in particular to a unique system of programming circuits which utilizes a horizon scanner for firing a rocket stage while in flight.

Up to the present time payloads have been placed into orbit with the aid of velocity-cutoff devices, steering controls, and various inertial-navigation components. In addition to the complexity of such devices and their tendency to reduce over-all reliability, they reduce the incremental velocity in the stage where they appear by adding dead weight and thereby reducing the mass ratio of unburnt to burnt weight. The present invention provides a simple, reliable and inexpensive rocket powered vehicle for launching a payload into orbit or into a non-orbiting trajectory by means of a multistage rocket system employing preset time and horizon scanning stage firing mechanisms and employing no steering controls whatsoever.

It is known that velocity increments for orbiting are most efficiently applied parallel to local horizontal. However, because of the atmospheric drag component, it is not desirable to apply horizontal velocity increments while in relatively dense atmosphere. Therefore a rapid climb is made through the earth's atmosphere to approximately 300,000 feet, for example, before the high-velocity rocket stages are fired nearly parallel to local horizontal. If this horizontal velocity is greater than the circular-orbital velocity at that altitude (25,780 ft. sec. at 300,000 feet), the vehicle will climb slowly to the apogee of an ellipse. At this apogee, a small additional velocity is supplied to prevent the vehicle from returning to a relatively dense atmospheric perigee. Since this climbing ellipse has its perigee at the beginning of its climb, its apogee is at the opposite side of the earth. In addition, the final stage can be fired 180 degrees in space orientation from the preceding stage which renders it possible to retro-mount the last stage since the vehicle, which is spin stabilized, will retain an approximately fixed space orientation above 300,000 feet.

The rocket vehicle employing the programming circuits of the present invention has four solid propellant rocket motors and the total vehicle weight is reduced to a minimum by utilizing vehicle coasting wherever possible. None of the propellant energy is used to change the vehicle attitude since all of the propulsion energy goes into achieving an orbit. In addition, to improve the simplicity, reliability and expense factors, the vehicle is launched from an airborne aircraft.

The general purpose of the rocket vehicle of the instant invention is to put into orbit a payload that obtains and transmits communication, navigation, reconnaissance and meteorological information. To have the payload receive and transmit most information of this type, it is not mandatory that the payload precisely obtain a predetermined orbit, but rather, it is only necessary that an orbital apogee and perigee be obtained within fairly broad permissible limits. This being the case, an acceptable orbit may be obtained when the control depends only upon preset timing mechanisms, which are not subject to modification after the vehicle is launched, rather than upon complex inertial guidance systems, etc. However, it is necessary that the preset timing mechanisms provide accurately timed pulses and that vehicle parameters be kept within relatively stringent tolerances in order to obtain an orbit within permissible limits. Some of these vehicle parameters are fuel energy level, the mass of various components, center of gravity, thrust, initial launch conditions which include release velocity, elevation and angle, etc.

Thus, although an acceptable orbit may be obtained by means of preset timers, the necessity of keeping within the stringent tolerances mentioned involves many difficulties. Utilization of a horizon scanning device, hereinafter described, to fire a rocket stage at optimum attitude of the vehicle during initial trajectory thereof increases the range of the tolerances and overcomes some of the aforementioned difficulties. In particular, use of the horizon scanner increases the permissible range of the initial launch angles for bringing about an acceptable orbit. This last-mentioned parameter is to be particularly noted since one of the most difficult vehicle parameters to obtain within permissible limits is the initial aircraft launch angle.

Briefly, the rocket vehicle is launched at approximately 50 degrees with respect to the horiozntal from an airborne aircraft using a loft angle computer. Shortly after release, the first stage is ignited by a preset timer. After first stage burnout the vehicle coasts to an altitude of approximately 300,000 feet. During first stage burning and coast, the vehicle is fin-stabilized with canted fins which gives the vehicle the required spin stability for the succeeding stages. The rate of spin is from about three to about five revolutions per second which is sufficiently low so that gravitational attraction, relatively dense atmosphere and fin stability cause the vehicle to trail to a nearly horizontal position. At this position, horizon sensing mechanisms mounted at an angle to the longitudinal axis of the vehicle may be used to cause ignition of the second stage, which jettisons the first stage and the fins. The second stage does not contain sufficient energy to achieve the velocity required for an acceptable orbit and it is therefore necessary to employ a third stage which is ignited by a preset timer shortly after burnout of the second stage. Ignition of the third stage jettisons the second stage and provides the additional velocity required to achieve an elliptical orbit having an approximately 1200 mile apogee. The fourth stage, which is fired at the apogee of the ellipse determined by the velocity vector at the third stage burnout, is retro-mounted on the third stage. To eliminate interference when the fourth stage is ignited, separation devices and preset timing circuits are employed to separate the third and fourth stages shortly after third stage burnout and to separate the nose cone and fourth stage shortly after third and fourth stage separation. When the fourth stage is fired by a preset timer at the apogee of the initial ellipse, sufficient velocity is added to cause the payload to transfer from a highly eccentric orbit (an apogee of 1200 miles and a perigee of 50 miles which would result in atmospheric burnout) to an orbit having an apogee of about 1200 miles and a perigee of about 1000 miles.

The timer required for the first stage ignition utilizes an RC circuit and a unijunction transistor. The output of the unijunction transistor is used to control a silicon diode which fires the first stage rocket. It is necessary to disarm the horizon scanner circuits during the initial phase of trajectory since infra-red scatter in the relatively dense atmosphere is sufficient to generate signals which appear as horizon signals. The horizon trigger circuit is armed approximately 100 seconds after first stage ignition when the vehicle is at an elevation such that the thin atmosphere will not generate a signal unless there is an actual horizon. The telescope of the horizon scanner, positioned at a predetermined angle with respect to the longitudinal axis of the vehicle, sweeps out a cone in space as the vehicle spins. This angle is determined by the anticipated firing altitude, the attitude of the vehicle relative to the horizon to be triggered on, the desired firing angle with respect to local horizontal, and any anomalies of the local geometry such as the variations in radii of curvature of the earth. The effects of the above mentioned factors can be computed and compensated for with sufficient accuracy. The horizon detector may be of the lead sulphide cell type wherein the back scattered light from the relatively dense atmosphere results in sufficient energy change to saturate the cell amplifier output. The amplifier output is integrated to provide a sufficiently large signal to fire the second stage ignition circuit. An override circuit is also included so that if the horizon trigger does not operate satisfactorily, the second stage motor will nevertheless be ignited. A multivibrator or flip-flop counting chain is triggered by a 25 second period oscillator wherein the counter outputs are used for arming the second stage firing circuit at 100 seconds and actuating the second stage override circuit at 200 seconds. In order to realize minimum first and second stage power supply weight, the power for firing the first stage motor, which requires more energy than the remaining smaller stages, is obtained from a capacitor bank which is charged by the power supply of the launching aircraft.

When the second stage motor ignites, a 25 second oscillator in the third and fourth stage circuitry starts driving a series of flip-flops. The outputs from these flip-flops are used for third stage ignition 50 seconds after second stage ignition, third and fourth stage separation at 100 seconds, fourth stage and nose cone separation at 200 seconds and fourth stage ignition at 3200 seconds.

As previously noted, fixed timing mechanisms have rendered the vehicle parameter tolerances too stringent to consistently obtain acceptable orbits. The following analysis is provided to demonstrate the ability of the horizon scanning device to provide greater vehicle parameter tolerances than that of a fixed timing mechanism. For brevity and since it is highly critical, this analysis is limited to the initial launch angle; however, it is likewise applicable to the remaining vehicle parameters.

The equations defining the motion of a particle in a vertical plane, a plane including a great circle of the earth, are defined as follows:

(1) $$M\frac{dv}{dt} = T - D - Mg \sin \theta$$

and (2) $$MV\frac{d\theta}{dt} = Mg \cos \theta + M\frac{V^2}{R} \cos \theta$$

where M is the mass, $$\frac{dv}{dt}$$

is the tangential acceleration, T is the thrust, D is the drag, g is gravity, V is the velocity, $\theta$ is the angle between local horizontal and the tangent of the trajectory, $$V\frac{d\theta}{dt}$$

is the normal acceleration and R is the radial distance from the center of the earth to tthe mass.

Drag is further defined as:

(3) $$D = \rho V^2 C_D A$$

where $\rho$ is the air density, V is the velocity, $C_D$ is the drag coefficient which is a function of Mach number, which is in turn a function of temperature and pressure, and A is the reference area of the particle in question.

Gravity is further defined as:

(4) $$g = g_0 \frac{Re^2}{R^2}$$

where $g_0$ is sea level gravity and $Re$ is the radius of the earth.

Thrust is further defined as:

(5) $$T = T_S + A_x(P_s - P)$$

where $T_S$ is measured thrust and is a function of time, $A_x$ is the nozzle exit area, $P_s$ is the atmospheric pressure at the static firing level and P is the pressure at the instantaneous altitude of the rocket.

Mass is further defined as:

(6) $$M = M_0 - M_p \frac{t - t_0}{t_b}$$

where $M_0$ is the initial mass of the rocket at time $t_0$ when the thrust begins, $M_p$ is the mass of the propellant, $t_b$ is the actual burning time, and $t$ is the instantaneous time between $t_0$ and $t_0 + t_b$.

The analytical simultaneous solution of differential equations 1 and 2 would require that M, T, D and R be defined in terms of time and such solution is formidable. It is therefore necessary to simultaneously solve Equations 1 and 2 by means of a computer employing consecutive time increments $\Delta t$.

Tables I and II show a comparison between the permissible launch angles of the horizon scanner and a preset timing device. The calculations for each of these tables employ exactly the same rocket components with the exception that Table I employs a horizon scanner mounted at the angle ($\alpha$) of 12 degrees between the axis of the horizon scanner and the axis of the rocket vehicle. Table II employs a preset timing device corresponding with a standard launch angle $\theta_0$ of 50 degrees from Table I. It should be noted that equations for the rocket height, the apogee and perigee are included in the computer program and are dependent upon the solution of V and $\theta$ of Equations 1 and 2. In addition, the firing point of the second stage, as determined by the triggering of the horizon scanner, is determined from the geometry of the earth with relation to the particle and the angle ($\alpha$).

The equation of this geometry is:

(7) $$\alpha = \theta + 90° - \sin^{-1} \frac{Re}{Re + h}$$

where $\alpha$ is the angle previously defined, $\theta$ is the angle between local horizontal and the vehicle axis, $Re$ is the radius of the earth and $h$ is the height of the vehicle above local horizontal. See FIGS. 2 and 3.

Since $\alpha$ is fixed at 12 degrees, for example, and the computer program provides $\theta$ and $h$ for each time increment $\Delta t$, the identity between the right and left sides of the Equation 7 establishes the angle $\theta$ at which the horizon scanner is triggered and the second stage is fired.

The following table shows the approximate limits of the horizon scanner launched at varying launch angles ($\theta_0$):

*Table I*

| $V_0$ (ft./sec.) | $\theta_0$ (degrees) | $h_0$ (feet) | $\theta$ (degrees) | $A_e$ (miles) | $P_e$ (miles) |
|---|---|---|---|---|---|
| 676 | 48 | 41,000 | 4.5 | 2,000 | 800 |
| 676 | 50 | 41,000 | 3 | 1,500 | 1,400 |
| 676 | 54 | 41,000 | 1.5 | 1,900 | 1,000 | where $V_0$ is the launch velocity, $\theta_0$ is the launch angle, $h_0$ is the launch elevation, $\theta$ is the angle between local horizontal and the axis of the vehicle, $A_e$ is the resulting apogee after the remainder of the rocket stages have been fired and $P_e$ is the resulting perigee after the remainder of the rocket stages have been fired.

The following table shows failure conditions of a preset timing mechanism launched at varying launch angles ($\theta_0$):

Table II

| $V_0$ (ft./sec.) | $\theta_0$ (degrees) | $h_0$ (feet) | $\theta$ (degrees) | $A_e$ (miles) | $P_e$ (miles) |
|---|---|---|---|---|---|
| 676 | 48 | 41,000 | −.443 | | |
| 676 | 50 | 41,000 | 3.0 | 1,500 | 1,400 |
| 676 | 52 | 41,000 | 6.4 | | | wherein $V_0$, $\theta_0$, $h_0$, $\theta$, $A_e$ and $P_e$ represent the same conditions as in Table I.

It should be noted that the initial launch conditions $V_0$ and $h_0$ are the same in Tables I and II. The optimum orbit of Table I is when the launch angle is 50 degrees since the apogee and perigee are most nearly the same (approximately a circular orbit). To properly compare the relative effectiveness of the two systems, the preset time of the timer of Table II is made equal to the time the horizon scanner of Table I is triggered. All of the orbits of Table I are acceptable since $A_e$ and $P_e$ are of sufficient elevation; however, the 48 and 52 degree launch angles of Table II are failures because the rocket vehicle is destroyed in the earth's atmosphere. From a comparison of these tables it can be seen that the launch angle tolerance of the horizon scanner is at least six degrees and the tolerance of the preset timer is less than four degrees. As previously indicated, it is of great importance that maximum launch angle tolerance be provided in order to increase the probability of obtaining orbit. The instant horizon scanner provides a highly reliable means for accomplishing this purpose.

The horizon scanner also provides considerable latitude in the tolerances of fuel energy level, mass, actuation of preset timers, initial launch velocity and elevation, etc. For example, Table III (below) shows that a launch angle of 48 degrees at 97% energy level (as compared with the 100% of Tables I and II) and a 54 degree launch angle at 104% energy level result in acceptable orbits. Obviously all combinations between these energy levels (97% to 104%) and launch angles (48° to 54°) would likewise result in acceptable orbits. It might also be noted that since a 48 degree launch angle at 97% energy level results in an acceptable orbit, a 100% energy level would decrease the permissible launch angle below 48 degrees thus providing a lower minimum launch angle than shown in Table I. Likewise, the upper launch angle (54°) of Table II would increase.

Table III

| Energy level percent | $V_0$ (ft./sec.) | $\theta_0$ (degrees) | $h_0$ (feet) | $\theta$ (degrees) | $A_e$ (miles) | $P_e$ (miles) |
|---|---|---|---|---|---|---|
| 97 | 676 | 48 | 41,000 | 4.5 | 1,400 | 500 |
| 104 | 676 | 54 | 41,000 | 1.5 | 2,700 | 1,300 |

It is recognized that all of the above analysis is based on a two degree of freedom particle analysis and it is assumed that the spin stabilized rocket will "trail." Obviously, a six degree of freedom analysis would result in greater accuracy; however, assuming the tolerances would decrease for the horizon scanner in a six degree of freedom analysis, they would in like manner decrease for the preset timing system.

Table IV illustrates one program of vehicle characteristics which will obtain an acceptable orbit. It is to be understood that any of a plurality of timing, weight, thrust, etc., characteristics may be successfully employed and the following characteristics are only by way of example.

Table IV

| Vehicle characteristics: | Range of values |
|---|---|
| (1) Length | 205 inches. |
| (2) Diameter | 24 inches. |
| (3) Weight— | |
| (a) Total | 3,000 ±50 lbs. |
| (b) Second-stage | 590 ±10 lbs. |
| (c) Third-stage | 78 ±2 lbs. |
| (d) Fourth-stage | 13.5 ±1 lb. |
| (4) Stage thrust— | |
| (a) First-stage | 12,000 lbs. ±4%. |
| (b) Second-stage | 3,000 lbs. ±3%. |
| (c) Third-stage | 510 lbs. ±4%. |
| (d) Fourth-stage | 160 lbs. ±5%. |
| (5) Stage burn-time— | |
| (a) First-stage | 34 sec. |
| (b) Second-stage | 39 sec. |
| (c) Third-stage | 25 sec. |
| (d) Fourth-stage | 3 sec. |
| (6) Programming circuit— | |
| (a) First-stage ignition time. | 5 sec. |
| (b) Horizon trigger firing angle. | 3 degrees (approx. 140 sec.). |
| (c) Third-stage ignition time. | 190 sec.[1] |
| (d) Jettison third-stage | 240 sec.[1] |
| (e) Jettison nose-cone | 340 sec.[1] |
| (f) Fourth-stage ignition time. | 3,240 sec.[1] |
| (7) Launch angle | 53 ±2 degrees. |
| (8) Launch velocity | 700 ft./sec. |
| (9) Launch elevation | 35,000 ft. |

[1] Times are referenced from zero time and are based on the approximate time of 140 seconds for second stage ignition by the horizon trigger firing circuit.

It is to be noted that the initial launch angle, elevation and velocity set forth in Table IV are different from those set forth in Table I. This is because different vehicle characteristics were employed in Table IV than were employed in Table I.

An object of the present invention is to provide an infra-red horizon scanner in a rocket vehicle to sense the earth's horizon and fire a rocket stage.

Another object is to provide an infra-red horizon scanning device in a rocket vehicle for sensing the earth's horizon and firing a rocket stage and thereby increase the reliability and accuracy of the vehicle.

A further object is to utilize a horizon scanning mechanism in a rocket vehicle to provide greater tolerance in vehicle parameters.

A still further object is to provide a horizon scanning mechanism in a spin-stabilized rocket vehicle that trails during initial flight, wherein the horizon scanner is mounted at an angle to the longitudinal axis of the vehicle thereby sensing the earth's horizon and activating a rocket stage.

Still another object is to utilize an infra-red horizon scanning mechanism in a multiple stage spin stabilized rocket vehicle that trails during initial flight, wherein the horizon scanner is mounted at an angle to the longitudinal axis of the vehicle and sweeps out a cone which senses the earth's horizon while the vehicle is at a slightly positive attitude and activates a rocket stage.

Other objects and many of the attendant advantages of this invention will become readily appreciated as the same becomes better understood by reference to the following detailed description when considered in connection with the accompanying drawings wherein.

Figure 6:
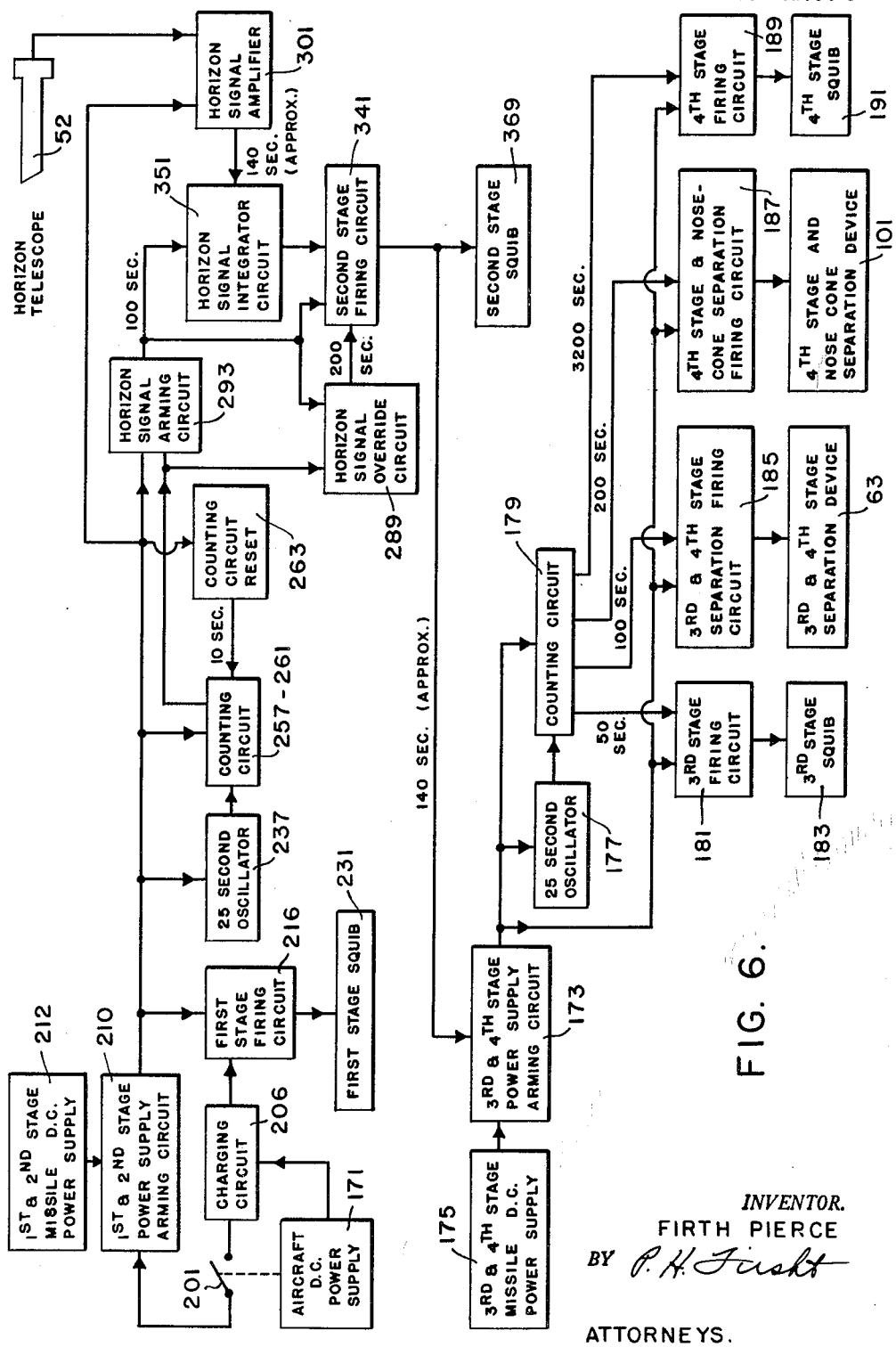

FIG. 4 diagrammatically illustrates the four stage rocket vehicle of the present invention;

FIG. 4A shows an enlarged fragmentary detail sectional view taken at 4A of FIG. 4;

FIG. 4B shows an enlarged fragmentary detail sectional view taken at 4B of FIG. 4;

FIG. 4C shows an enlarged fragmentary detail sectional view taken at 4C of FIG. 4;

FIG. 4D shows an enlarged fragmentary detail sectional view taken at 4D of FIG. 4C;

FIG. 4E shows an enlarged fragmentary detail sectional view taken at 4E of FIG. 4C;

FIG. 5 shows an enlarged cross sectional view of the horizon scanner telescope shown in FIG. 4;

FIG. 6 is a block diagram of the rocket vehicle programming circuitry; and

Figure 7B:
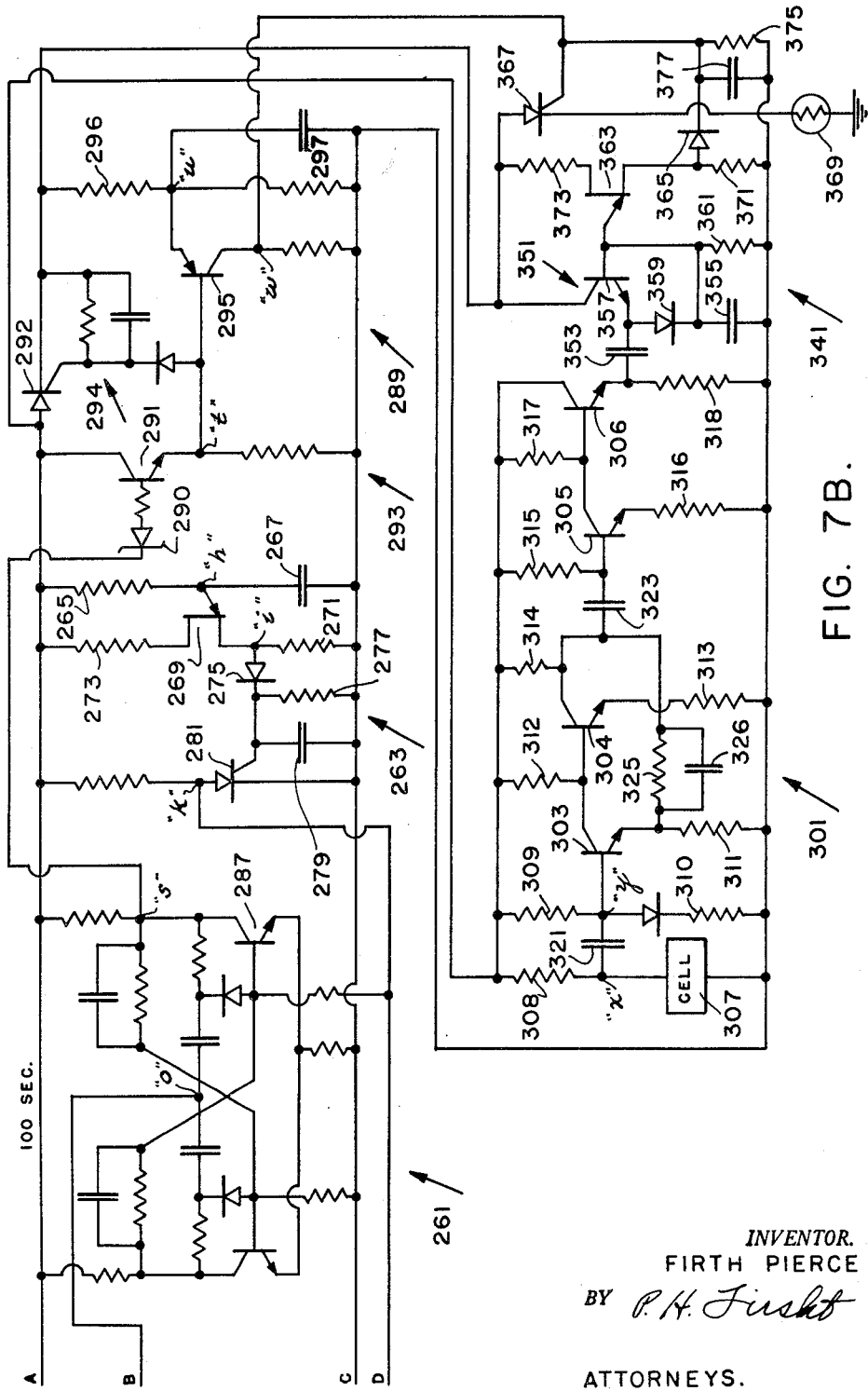

FIG. 7A and FIG. 7B together schematically illustrate the first and second stage programming circuits shown by block diagram in FIG. 6.

Figure 1:
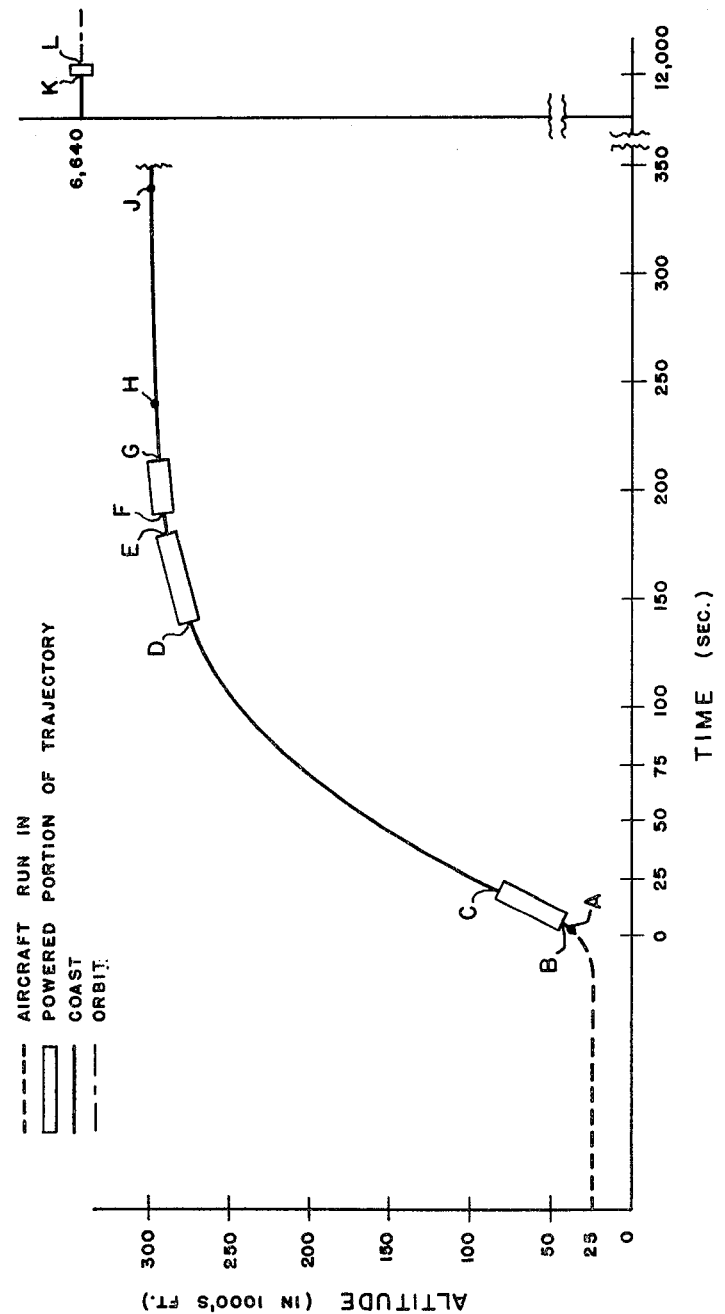
FIG. 1 illustrates the trajectory of the rocket vehicle of the present invention as a function of time and altitude from launch through burnout of the fourth stage.
Figure 2:
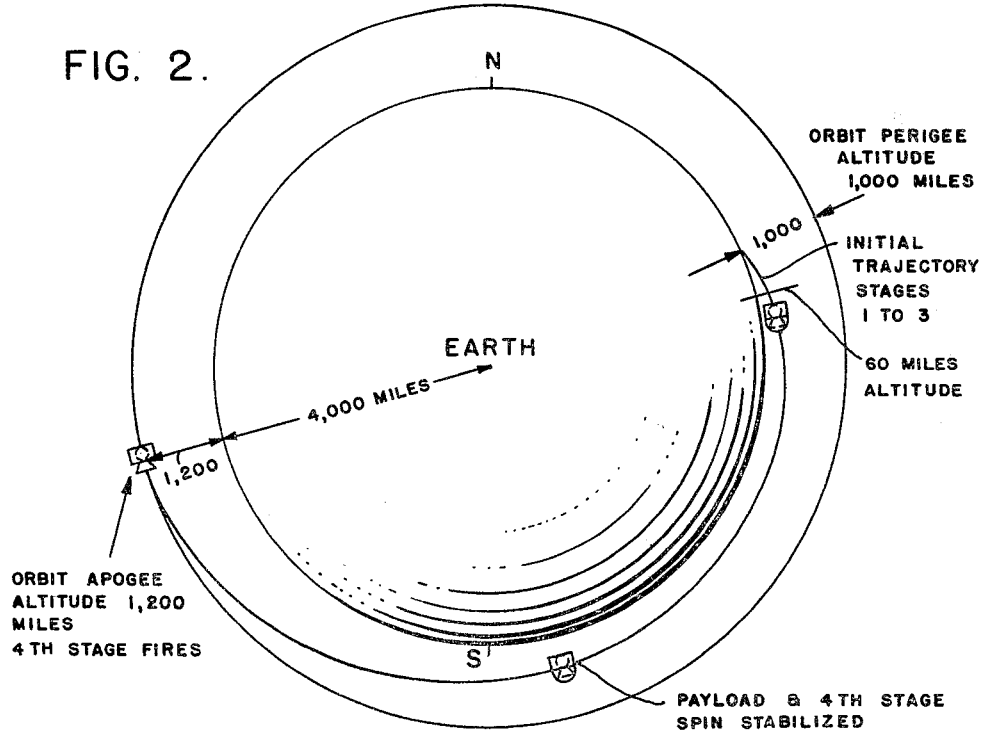
FIG. 2 illustrates the vehicle trajectory, space orientation and final orbit relative to the earth.

The rocket vehicle trajectory is illustrated in FIGS. 1 and 2. The FIG. 1 illustration shows the trajectory as a function of time and altitude through burnout of the fourth stage. The broken line indicates aircraft run-in and pull-up, the double lines indicates the powered portions of the trajectory and the solid lines indicate coast periods. The letter "A" indicates the vehicle release, "B" firing of the first stage, "C" burnout of the first stage, "D" firing of the second stage and jettison of the first stage, "E" burnout of the second stage, "F" firing of the third stage and jettison of the second stage, "G" burnout of the third stage, "H" jettison of the third stage, "J" jettison of the nose cone, "K" firing of the fourth stage and "L" burnout of the fourth stage.

In FIG. 2 is shown the vehicle trajectory, the fourth stage and payload space orientation and the final orbit with relation to earth. It should be noted that the fourth stage and payload are spin stabilized such that space orientation remains fixed. Therefore, when the retro-mounted fourth stage and payload are approximately 180 degrees from the launch position, they are space oriented such that ignition of the fourth stage rocket accelerates them along their velocity vector resulting in an orbit having an apogee of about 1200 miles and a perigee of about 1000 miles.

Figure 3:
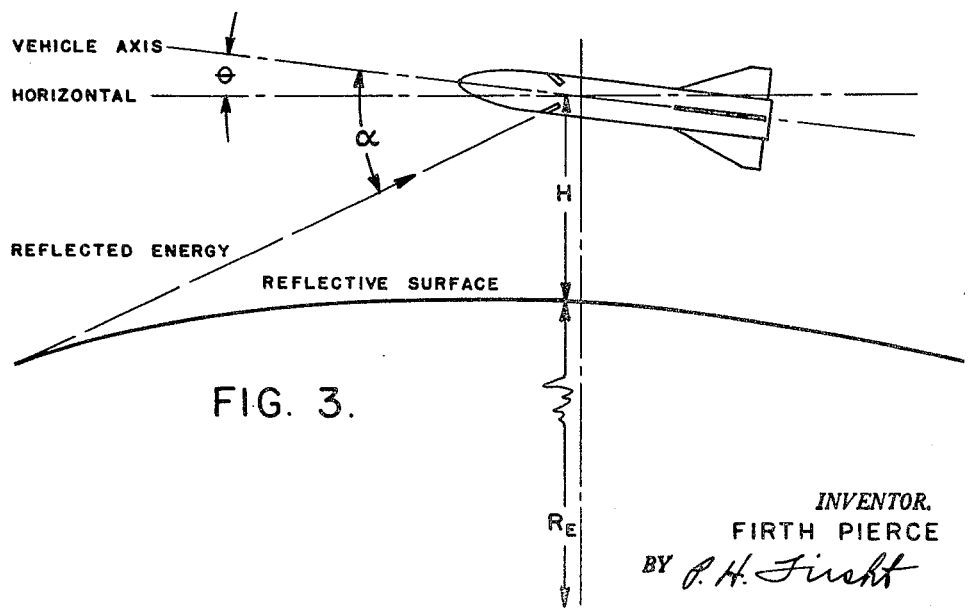
FIG. 3 illustrates the horizon triggering position of the vehicle with relation to earth.

In FIG. 3 is shown the horizon triggering position of the vehicle with relation to earth. It should be noted that the horizon scanners are mounted at an angle ($\alpha$) of 12 degrees with respect to the vehicle axis. As previously explained, the vehicle parameters assumed will result in igniting the second stage when the longitudinal axis of the vehicle is at an angle $\theta$ of approximately three degrees with relation to local horizontal and at an elevation of approximately 300,000 feet.

In FIG. 4 is illustrated the four stage rocket vehicle of the present invention comprising first stage 11, second stage 12, third stage 13 and fourth stage 14. The exterior surface of the rocket vehicle is streamlined and consists of nose cone 16, casing 17, the cylindrical exterior surface of first stage 11 and shroud 19. Casing 17 comprises front section 21 and rear section 23 and encloses the second, third and fourth stage rocket motors. The first stage rocket 11 consists of a longitudinally extended cylinder having a curved front surface 25, a converging rear surface 27 and a divergent nozzle 29 extending rearwardly from rear surface 27 and having a carbon liner 31 on the interior surface thereof.

Shroud 19 is cylindrical, open at both ends, and is provided to enclose surface 27 and nozzle 29 in order to reduce atmospheric frictional losses. As best depicted in FIG. 4A, the forward end of shroud 19 is rigidly attached to annular member 33 which is rigidly attached to surface 27 by welding or any other suitable means. The outside diameters of shroud 19 and annular member 33 are approximately equal to the outside diameter of the cylindrical section of the first stage rocket 11. The rocket vehicle is provided with four fins 35 which are disposed at 90 degree intervals and are mounted on the exterior surface of shroud 19 and the rear cylindrical portion of the first stage rocket 11. These fins are canted at approximately one degree in order to impart from about three to about five revolutions per second spin to the rocket vehicle such that the vehicle will trail until firing of the third stage and will thereafter remain in fixed space orientation.

The second stage rocket 12 has a nozzle 47 and a shroud 49 surrounding the greater portion of nozzle 47. Curved front surface 25 of the first stage 11 is aligned with nozzle 47 such that upon ignition of the second stage, the expanding gases will cause separation of the first and second stages.

Rear section 23 of casing 17 is forwardly tapered with the large diameter thereof fixedly attached to surface 25. As best shown in FIG. 4B, annular member 37 is rigidly connected to surface 25 and section 23 is connected to annular member 37 by means of rivets 39 or other fastening means. Front section 21 is forwardly tapered and has a large diameter equal to the small diameter of rear section 23. As illustrated in FIG. 4C, front section 21 is rigidly connected to the forward end of second stage 12 by means of annular brace 40 and annular U-channel 41. Rear section 23 is connected to one leg of annular U-channel 41 by means of shear pins 43. The shear strength of the connection shown in FIG. 4B is greater than the longitudinal shear strength of pins 43; therefore, rear section 23 and front section 21 and consequently the first and second stages, will separate at a parting plane designated 45 when the second stage motor is ignited.

The first and second stage electronic fire control systems, the details of which are hereinafter described, are disposed in annular package 51 which is mounted on the interior surface of rear section 23 between the first and second stages. Two horizon scanner mechanisms 52, the details of which are hereinafter described, are mounted on the interior surface of rear section 23 at 12 degrees, for example, from the longitudinal axis and are disposed forward of package 51. An opening 53 is provided in the rear section 23 so that infra-red signals may be received by each horizon scanner mechanism. It is to be understood that one or more horizon scanner mechanisms may be employed with corresponding circuitry modifications.

As best depicted in FIG. 4C, the third stage motor 13 is substantially spherical, has a solid propellant grain 54 and an internal divergent carbon nozzle 55 attached to spherical surface 56 by means of annular member 57. The third stage is laterally supported by annular ring 59 which is fixedly attached to front section 21 by means comprising brace sections 61.

Disposed between the third and fourth stages, as shown in FIGS. 4, 4C and 4D, is a separation device generally denoted by numeral 63. Separation device 63 includes an internally threaded cup shaped member 65 which is closed at one end and has an exterior surface at the closed end shaped to fit the exterior surface of the third stage 13 and is rigidly connected thereto by welding or other suitable means. Cylinder 67 is externally threaded at one end and is operably engaged with the mating threads of member 65. Cylinder 69 has an inside diameter which is slightly larger than the outside diameter of cylinder 67 and is closed at one end, the exterior surface being shaped to fit the exterior surface of the fourth stage 14 and rigidly connected thereto. Cylinder 67 is slidably disposed in cylinder 69 thereby forming an enclosed volume 71 which contains a gas producing material so that separation of the third and fourth stages results upon ignition of the material.

Seperation device 63 also functions as a support for a nutation damper 73, payload package 75 and the third and fourth stage electronic fire control package 77 (FIGS. 4C and 4D). The exterior surface of cylinder 69 includes a radially extending flange 79 for axial support of nutation damper 73 which is slidably disposed on the outer surface of cylinder 69 and is rigidly held in place by means of internally threaded flange 76 which abuts annular package support plate 80. The nutation damper has an annular cavity therein which is partially filled with mercury and functions to damp the gyro nutation frequency due to the rocket spin imparted by the canted fins.

The payload is disposed in annular package 75 and the third and fourth stage electronic circuits are disposed in annular package 77 (FIG. 4C). These packages are rigidly connected together by means of annular plate 81 which is supported by cylinder 69 (FIG. 4D). In addition, payload package 75 is connected to the fourth stage motor by means of support member 83 which is shaped to fit the outer surface of the fourth stage to provide maximum payload volume.

A plurality of braces 85 are attached to and disposed radially about the inner surface of nose cone 16 to provide lateral support for the fourth stage and connected packages. These brace supports are slidable with relation to payload package 75 and brace sections 61. Annular brace 87 is rigidly attached to nose cone 16 and shear pins 89 are inserted through front section 21, brace 87 and brace sections 61 thereby forming a parting plane at 91.

The fourth stage motor 14 is spherical and has an internal divergent nozzle 93 attached to spherical surface 95 by means of annular members 97 and 99 as best seen in FIG. 4E. It is understood, of course, that this stage is provided with a solid propellant grain similar to grain 54 of third stage 13.

Separation device 101, which is used to separate the nose cone from the fourth stage, includes cup shaped member 103 having a radially extending flange which is slidably mounted on the interior surface of ring 105 and closes nozzle 93. Another cup shaped member 107 has an integral longitudinally extended bolt that is inserted into nose cone brace members 109 and connected thereto by nut 111. Member 103 is slidably disposed in member 107 thereby forming a cylindrical enclosed volume 113 which is filled with gas producing material so that separation of the nose cone from the fourth stage results upon ignition thereof. It should be noted that there is no rigid interconnection that must shear upon ignition of separation device 101. However, the nose cone and fourth stage will remain together until ignition of device 101 since during acceleration and coasting there are no forces tending to cause separation.

In FIG. 5 is shown a cross sectional view of the horizon scanner telescope generally denoted by numeral 52 in FIG. 4. The telescope includes a longitudinally extending cylinder having a lens section 121, a center section 123 and a cell section 125 wherein the lens and cell sections are of larger diameter than the center section. A convex lens 127 is disposed in lens section 121 and is retained in a fixed position between a shoulder 129 and a threaded ring 131. The center section 123 has an inner surface 133 which is finely threaded throughout its entire length and serves to diffuse stray light and thereby prevent undesirable reflection. Apertures 135 and 137 are externally threaded to correspond with the fine threads on inner surface 133 and are rigidly held in place by set screws 139. The opening diameter of aperture 135 is greater than that of aperture 137 and they are longitudinally positioned such that the converging light beam will be slightly spaced inwardly from the edges of the openings. Disposed in cell section 125 is a cylindrical cell holding block 141 which is rigidly held in position by set screw 143. Aperture 145 is held in facial contact with the front surface of block 141 by means of screws 147 and cell 149, which may be of the lead sulphide type, is attached to block 141 directly behind the opening in aperture 145 such that light energy impinges only on the sensitive surface thereof. The lead wires of cell 149 are connected to externally threaded insulation terminals 151 and 152 which are disposed in openings in the rear section of block 141. Cup shaped cover plate 153 is connected to the rear surface of block 141 and is provided with an insulated output terminal 155 which has an insulated extension 157 in contact with the rear surface of block 141 to prevent longitudinal movement of cover plate 153. The lead wire from terminal 151 is communicated through extension 157 and the insulated portion of terminal 155 and is connected to threaded connector 159. The lead wire from terminal 152 is passed directly through an insulator 161.

The electrical wiring and ignition squibs for the rocket stages and stage separation devices are conventional and are not shown for reason of simplicity.

The sequential operation of the above described four stage rocket vehicle is as follows: The entire rocket vehicle is launched from an aircraft and after a time increment the first stage 11 is ignited. During the burn period of the first stage the canted fins import rotation to the entire vehicle which provides spin stabilization throughout the remainder of flight. After burn-out of the first stage and a coast period, the period being determined by the time necessary for the horizon scanner to receive signals, the second stage 12 is ignited. Upon ignition of the second stage, there is separation, at parting plane 45, of the first stage 11, fins 35, shroud 19, rear section 23 and the components attached thereto, including package 51 and horizon scanner 52, from the remainder of the rocket (second, third, and fourth stages, front section 21, nose cone 16, etc.). The third stage 13 is ignited at a predetermined time increment after burnout of the second stage. Upon ignition of the third stage there is separation, at parting plane 91, of second stage 12, front section 21 and attached components including brace sections 40 and 61 and ring 59 from the remainder of the rocket (third and fourth stages and nose cone 16, etc.) A short time increment after burnout of the third stage, the charge in separation device 63 is ignited which results in separation of the third stage from the remainder of the vehicle. An additional time increment after actuation of separation device 63, the charge in separation device 101 is ignited which results in separation of nose cone 16 and connected braces, including braces 85, from the fourth stage and packages 75 and 77. After an additional time increment, the retro-mounted fourth stage 14 is ignited which results in obtaining orbit for the payload 75, package 77 and burnt-out fourth stage 14.

FIG. 6 diagrammatically illustrates, by block diagram, the various rocket vehicle programming circuits. The aircraft used to launch the vehicle has a D.C. power supply 171 which is employed to charge the capacitors of charging circuit 206 through an electrical plug adapted to separate when the rocket vehicle is launched. A mechanical connection between the aircraft and vehicle is provided such that upon launching, switch 201 is closed. Upon launching of the vehicle and closure of switch 201, charging circuit 206 provides the necessary potential to activate first and second stage power supply arming circuit 210 which permits power from the first and second stage D.C. power supply 212 to be applied to first stage firing circuit 216, 25 second oscillator 237, counting circuit 257–261, counting circuit reset 263 and horizon signal amplifier 301. Horizon signal arming circuit 293 prevents power from being applied to horizon signal override circuit 289, horizon signal integrator circuit 351 and second stage firing circuit 341 until 100 seconds after launch so that back scatter from the relatively dense atmosphere will not actuate the second stage firing circuit.

First stage firing circuit 216 provides a five second time delay after launch in order to provide sufficient time for the launching aircraft to escape from the blast of the first stage rocket motor. At the end of this delay period the charge stored in charging circuit 206 is discharged through the firing circuit 216 and through first stage squib 231, thereby igniting the first stage rocket motor. Since power is supplied to oscillator 237 immediately after the vehicle is launched, oscillator 237 provides its first pulse 25 seconds after launch and consecutive pulses thereafter at 25 second intervals. These pulses are applied to counting circuit 257–261. Counting circuit reset 263 is provided to keep the counting circuit inactivated until after the first stage rocket motor is fired in order to prevent tripping by stray voltage pulses and to establish a predetermined state for the flip-flop circuits, hereinafter described, in the counting circuit. Thus, for a period of approximately 10 seconds after launch the counting circuit is inactive, whereupon it is activated so that it will be responsive to the first 25 second pulse from oscillator 237. It is to be understood that the counting circuit may be inactivated for any period between 5 and 25 seconds and that 10 seconds was selected only as an approximately median period. At 100 seconds, counting circuit 257–261 provides a pulse which activates horizon signal arming circuit 293 which permits power from power supply 212 to be applied to horizon signal override circuit 289, horizon signal integrator circuit 351 and second stage firing circuit 341. At approximately 140 seconds the infra-red detector in horizon telescope 52 will receive infra-red signals from the earth's surface, or from reflection from the earth's dense atmosphere. The signal from telescope 52 is applied to amplifier 301, the output of which is applied to integrator circuit 351 which in turn activates second stage firing circuit 341. Upon activation of the second stage firing circuit, power is transmitted therethrough and through second stage squib 369 which ignites the second stage rocket motor. Horizon signal override circuit 289 is provided to activate the second stage firing circuit in the event it is not activated by the horizon signal. At 200 seconds the output of counting circuit 257–261 activates horizon signal override circuit 289 which activates second stage firing circuit 341 which causes ignition of the second stage rocket motor.

The output signal from activation of the second stage firing circuit, which is applied to the second stage squib, is also applied to the third and fourth stage power supply arming circuit 173 which permits power from third and fourth stage power supply 175 to be applied to all of the third and fourth stage circuitry. Since power is supplied to 25 second oscillator 177 immediately after firing the second stage, this oscillator applies its first pulse to counting circuit 179 25 seconds after firing the second stage and at 25 second intervals thereafter. At 50 seconds after second stage firing, counting circuit 179 applies a signal to third stage firing circuit 181 which permits power to be applied to third stage squib 183 thereby igniting the third stage rocket motor. At 100 seconds, an output pulse of counting circuit 179 is applied to separation firing circuit 185 which permits power to be applied to separation device 63 thereby separating the third and fourth stages. At 200 seconds, an output pulse of the counting circuit 179 is applied to separation firing circuit 187 which permits power to be applied to separation device 101 thereby separating the fourth stage and nose cone. At 3200 seconds, an output pulse of the counting circuit 179 is applied to fourth stage firing circuit 189 which permits power to be applied to fourth stage squib 191 thereby igniting the fourth stage rocket motor.

From the foregoing it can be seen that a relatively simple programming system is provided for launching a payload into orbit wherein it is unnecessary to resort to an inertial guidance and computer system.

FIGURES 7A and 7B are to be considered together and schematically illustrate the first and second stage programming circuits. During the period when the rocket vehicle is fixed to the launching aircraft, capacitors 203 and 205 of charging circuit 206 are charged by means of an external D.C. power supply, which may be the aircraft D.C. power supply 171 shown in FIG. 6. The positive potential of this power supply is connected to terminal X and the negative or ground potential is connected to terminal Y. Charge measuring instruments may be operatively connected to these capacitors to determine whether they are sufficiently charged for proper operation.

Since silicon controlled rectifier 229 would break down if the external power supply was applied directly to the anode thereof, an R-C network including resistor 204 and capacitor 205 and transistor 207 is employed to provide a gradually increasing voltage. When the external power is applied to terminals X and Y, the voltage at point $a$ increases as a function of time as determined by the value of resistors 204 and capacitor 205. The voltage at $a$ is applied to the base of transistor 207 wherein the conduction thereof increases with increased base voltage and the voltage applied to the anode of silicon controlled rectifier 229 is thus gradually increased thereby preventing breakdown. It can therefore be seen that prior to launching and after the external power has been turned "on," that capacitors 203 and 205 are charged and a positive potential is applied to the anode of silicon controlled rectifier 229.

The first and second stage power supply arming circuit 210 includes switch 201, diode 209, silicon controlled diode 211, resistor 213 and capacitor 215 and receives its activating energy from capacitor 205. Switch 201 may be, for example, a spring biased mechanical switch that is operatively mounted in the rocket vehicle and is adapted to be closed with launching of the vehicle and separation from the aircraft and its power supply. When the vehicle is launched and switch 201 is closed, the positive potential on capacitor 205 is applied through diode 209 to the bias network, including resistor 213 and capacitor 215, of silicon controlled rectifier 211. Since the voltage drop across the bias network results in the gate having a higher potential than the cathode, silicon controlled rectifier 211 will conduct. The internal D.C. power supply 212 is connected to the anode of silicon controlled rectifier 211 and when it becomes conducting, D.C. power is supplied to all circuits shown in FIGS. 7A and 7B except the horizon signal override circuit 289, the horizon signal integrator circuit 351 and the second stage firing circuit 341. It should be noted that when the vehicle is launched and capacitor 205 is discharged, that transistor 207 is turned "off" and capacitor 203 will therefore retain its charge. In addition, when silicon controlled rectifier 211 becomes conducting, the gate thereof nearly reaches the positive potential of power supply 212. Therefore, diode 209 is provided to prevent this potential from being applied to the base of transistor 207 and turning it back "on."

Referring to the first stage firing circuit 216, when the internal power supply 212 is turned "on," the voltage at point $b$ of the R-C timing circuit including resistor 217 and capacitor 219, increases to a value which is sufficient to turn unijunction transistor 221 "on." The values of resistor 217 and capacitor 219 are selected so that transistor 221 turns "on" approximately five seconds after switch 201 is closed. When transistor 221 is turned "on," the potential at point $c$, as determined by voltage divider resistors 223 and 225, increases and is applied through diode 227 to the cathode and gate of silicon controlled rectifier 229 thereby turning it "on" and permitting discharge of capacitor 203 through squib 231 and igniting the first stage rocket motor.

Oscillator 237 has power supplied thereto when silicon controlled rectifier 211 is turned "on." The period of oscillation is primarily determined by the setting of potentiometer 238, the values of resistor 239 and capacitor 241 and the voltage standoff ratio ($e/B_2$) of unijunction transistor 243. As the voltage at point $d$ increases to a value where the standoff ratio is obtained, capacitor 241 will discharge through the $e-B_1$ junction of unijunction transistor 243 and increases the potential at point $f$. Zener diode 245 will conduct when the voltage at point $f$ exceeds the zener voltage and transistor 247 will turn "on" when sufficient voltage is applied to the base thereof. The time when the voltage at the base of transistor 247 will be sufficient to turn it "on" is arranged to be after the time when unijunction transistor 243 is turned "off," which occurs when the voltage at $d$ drops to a value less than the standoff ratio due to the discharge of capacitor 241 through the $e-B_1$ junction of unijunction transistor 243. The values of resistor 249 and capacitor 251 are selected to provide this necessary voltage time delay. Shortly after unijunction transistor 243 is turned "off," transistor 247 is turned "on" which shorts capacitor 241 to ground. If capacitor 241 were not shorted to ground, the charge remaining thereon when unijunction transistor 243 is turned "off" would vary quite appreciably from cycle to cycle which results in non-uniform periods of oscillation. By shorting capacitor 241 to ground, through transistor 247, it is possible to start each cycle of oscillation at very nearly the same potential. It should be noted that capacitor 241 will retain some residual charge even though it is shorted; however, the residual charge is relatively small and cycle to cycle potential variations are likewise small resulting in nearly equal oscillation periods. The positive voltage pulse of point $f$, from oscillator 237, is applied to the base of transistor 253, thereby rendering it conducting, which provides a nearly ground potential pulse at point $g$ for triggering flip-flop circuit 257.

Flip-flop circuits 257, 259 and 261 are conventional and the details thereof will therefore not be described. Reset circuit 263, shown in FIG. 7B, is provided to prevent stray voltage pulses, which may be caused by firing the first stage rocket, from tripping flip-flop circuits 257, 259 and 261. In addition, the reset circuit retains each flip-flop circuit in a pre-determined state so that proper timing will be obtained. The reset circuit includes an R-C timing network including resistor 265 and capacitor 267 the values of which determine the period of time, after the power is applied, for the voltage at point $h$ to reach a magnitude that will turn unijunction transistor 269 "on." When transistor 269 is turned "on," the positive potential at point $i$, determined by voltage divider resistors 271 and 273, is applied through diode 275 to a bias network including resistor 277 and capacitor 279 of silicon diode 281 thus rendering silicon controlled rectifier 281 conducting. Prior to silicon controlled rectifier 281 being turned "on," the potential at point $k$ is at B+ and after it is turned "on" the potential approaches ground. The voltage at point $k$ of the reset circuit is applied to the bases of transistors 283, 285 and 287. From this it can be seen that each of the flip-flop circuits is held in a predetermined state by the application of B+ potential to the base of transistors 283, 285 and 287 and cannot be removed from that state by extraneous voltage pulses. When the B+ potential is removed, transistors 283, 285 and 287 will remain in the "on" state until a ground potential pulse is applied respectively at point $l$, $m$ or $o$ to remove them from the "on" state. In the instant embodiment, the first stage fires five seconds after launch and the first pulse from oscillator 237 is 25 seconds after launch. The values of resistor 265 and capacitor 267 are selected such that a time of 10 seconds after launch lapses, which is between the above mentioned five and 25 seconds, before the voltage at point $k$ goes to ground.

In brief, the operation of the flip-flop circuits is as follows: At 25 seconds after launch, oscillator 237 causes the potential at point $l$ to go negative or to nearly ground potential with relation to B+ whereupon transistor 283 is turned "off" and transistor 288 is turned "on" and point $p$ goes positive (B+) which does not affect the state of flip-flop 259 since transistor 285 is already conducting. Therefore, at 25 seconds the potential at points $r$ and $s$ remain negative. At 50 seconds, the potential at points $l$ and $p$ are negative, point $r$ is positive and point $s$ remains negative. At 75 seconds, the potential at point $l$ is negative, points $p$ and $r$ positive and point $s$ remains negative. At 100 seconds, the potential at points $l$, $p$ and $r$ are negative and the potential at point $s$ becomes positive. At 200 seconds point $s$ returns to negative. In other words, flip-flop 257 changes state four times for a single change of state of flip-flop 261.

The horizon signal arming circuit 293 and horizon signal override circuit 289 function as hereinafter described. Zener diode 290 is provided which has a zener voltage greater than the voltage at point $s$ when transistor 287 is conducting. When transistor 287 becomes non-conducting, the voltage at $s$ increases above the zener voltage of zener diode 290 and is applied to the base of transistor 291 which turns it "on," which in turn turns silicon controlled rectifier 292 "on" through bias network 294. When silicon controlled rectifier 292 is turned "on," power is then applied to horizon signal override circuit 289, horizon signal integrator circuit 351 and second stage firing circuit 341. The voltage at point $t$ is greater than the voltage at point $u$ when transistor 291 is conducting and transistor 295 is therefore back biased and will not conduct. From 100 to 200 seconds, the voltage at point $s$ is greater than the zener voltage of zener diode 290 and transistor 295 will therefore not conduct during this period. At 200 seconds, flip-flop 261 again changes state and the voltage at point $s$ goes negative and becomes less than the zener voltage and transistor 291 is turned "off." At this time the voltage at point $t$ goes to nearly ground potential and since the voltage at $u$ is greater than the voltage at $t$, transistor 295 will conduct. When transistor 295 conducts, the voltage at point $w$ becomes positive and fires the second stage rocket by turning on silicon controlled rectifier 367 of second stage firing circuit 341. This is an override function in the event that the horizon scanner fails to provide a signal to fire the second stage at approximately 140 seconds. Since the voltage at $u$ will drop when transistor 295 is turned "on," because of larger current flow and greater drop across resistor 296, capacitor 297 is provided to retain the original potential at point $u$ thereby assuring that transistor 295 will remain "on" for a sufficient period of time to assure firing the second stage rocket motor.

In summary, during the first 100 seconds, point $s$ is negative, transistor 291 is "off," point $t$ is negative, silicon controlled rectifier 292 is "off," transistor 295 is "off" and point $w$ is negative and therefore silicon controlled rectifier 367 of the second stage firing circuit is "off." From 100 to 200 seconds, point $s$ is positive, transistor 291 is "on," silicon controlled rectifier 292 is "on," transistor 295 is "off" since it is back biased and therefore point $w$ is negative and therefore silicon controlled rectifier 367 is "off." At 200 seconds, point $s$ is negative, transistor 291 is "off," silicon controlled rectifier 292 remains "on" (as previously explained with reference to silicon controlled rectifier 211) and transistor 295 is "on" and therefore point $w$ is positive which turns "on" silicon controlled rectifier 367 and fires the second stage. By this means it is possible to provide a simple arm and override circuit without the necessity of employing an additional flip-flop circuit for obtaining a 200 second override pulse.

The horizon signal amplifier 301 shown in FIG. 7B comprises transistors 303, 304, 305 and 306 wherein the potential applied to the base of the first stage transistor 303 is determined by the resistance of photoconductive cell 307. Cell 307 may be of the lead sulphide type, for example, having a range of spectral sensitivity in the infrared region. Cell 307 is series connected with resistor 308 to the negative and positive potentials to provide operating bias. The D.C. bias for transistors 303, 304, 305 and 306 is provided by resistors 309 through 318 and the values thereof are adjusted to operate the transistors in their regions of linearity. The signal from cell 307 is coupled to transistor 303 by capacitor 321 and the signal from transistor 304 is coupled to transistor 305 by capacitor 323. A degenerative feedback circuit including resistor 325 and capacitor 326 is connected between transistors 304 and 303.

The operation of this circuit is as follows: When an infra-red signal is applied to cell 307, the resistance thereof is decreased causing the potential at point $x$ to be negative with relation to the D.C. potential at point y. The potential at x is superposed on the potential at y by means of capacitor 321 thus reducing the potential at the base of transistor 303 and rendering it less conducting. When transistor 303 is rendered less conducting, the potential applied to the base of transistor 304 is more positive since the voltage drop across resistor 312 is decreased. The positive base signal applied to transistor 304 renders it more conducting and the collector potential thereof is rendered more negative since the voltage drop across resistor 314 is increased. This negative going collector potential is fed back through parallel connected resistor 325 and capacitor 326 to the emitter of transistor 303 thereby forming a degenerative feedback. Capacitor 326 is provided to obtain low impedance at high frequencies in order to apply a relatively large degeneration signal to transistor 303 when high frequency noise spikes appear. The negative going signal of the collector of transistor 304 is also applied to one side of capacitor 323 and increased current will flow through resistor 315 to the other side of capacitor 323. Due to this increased current flow there is a greater voltage drop across resistor 315 and a corresponding negative potential applied to the base of transistor 305 thus rendering it less conducting. Since transistor 305 is rendered less conducting, the potential at the base of transistor 306 is increased and rendered more conducting whereupon the amplified signal appears across resistor 318.

Also in FIG. 7B is shown second stage firing circuit 341 employed to fire squib 369 of the second stage rocket. The firing circuit includes horizon signal integrator circuit 351 having capacitors 353 and 355, transistor 357, diode 359 and resistor 361. The voltage across resistor 318 of amplifier circuit 301 is applied to the input of the integrator circuit 351 which operates as follows: When a positive pulse appears across resistor 318, diode 359 is forward biased and permits current flow thereby positively charging capacitor 355 to a given potential. The positive potential of capacitor 355 is applied to the base of transistor 357 and the emitter of unijunction transistor 363. The positive potential on transistor 357 is sufficient to render it somewhat conducting and there is current flow from B+ through the collector-emitter to capacitor 353. The potential established on capacitor 353 is determined by the collector-emitter current flow which is dependent on the positive potential applied to the base of transistor 357. Capacitor 353 remains at approximately this established potential during the time increment that the voltage across resistor 318 decreases to a value below the positive pulse. The next positive pulse is added to the potential already on capacitor 353, thus charging capacitor 355 to a greater potential than obtained when the first pulse was applied. This higher potential on capacitor 355 renders transistor 357 more conducting which permits greater current flow from B+ to capacitor 353. This results in a linear stepped voltage increase until the positive potential on capacitor 355, which is applied to the emitter of unijunction transistor 363, is of sufficient value to render transistor 363 conducting. When this condition occurs, capacitor 355 discharges through transistor 363 and through diode 365 to the gate of silicon controlled rectifier 367. Silicon controlled rectifier 367 is thus rendered conducting by this positive gate potential and current flows therethrough and in series with squib 369 thus firing the second stage rocket motor. Resistor 361 has high resistance and is employed to bleed any charge that may be on capacitor 355 prior to the horizon scanner receiving horizon signals. When the horizon scanner receives horizon signals and positive pulses appear across resistor 318, the current through resistor 361 is not sufficient to alter the linear stepped voltage increase on capacitor 355. Resistors 371 and 373 establish the bias on unijunction transistor 363 and resistor 375 is a bleed resistor for capacitor 377.

Since there is capacitive coupling between the gate and cathode of silicon controlled rectifier 367, a positive potential would appear on the gate, upon the application of B+. Therefore capacitor 377 is provided to short this positive potential to ground thereby preventing silicon controlled rectifier 367 from turning "on" when B+ is applied.

The specific embodiment of the third and fourth stage programming circuits, shown in block diagram in FIG. 6, are not herein described since the specific operation thereof is obvious in view of the above description of the first and second stage programming circuits. However, it should be noted that oscillator 177 is the same as oscillator 237, that counting circuit 179 has eight flip-flops to provide a 3200 second signal and that firing circuits 181, 185, 187 and 189 may be similar to the first stage firing circuit.

It should be noted that predetermined non-orbiting trajectories for probing space may be obtained by changing the firing time of the various stages or by varying other vehicle parameters. To obtain trajectories of this type it will be necessary to omit or forward mount the fourth stage rocket unless a high spin rate is employed which would necessitate the use of spin rockets as previously mentioned.

Obviously many modifications and variations of the present invention are possible in the light of the above teachings. It is therefore to be understood that within the scope of the appended claims the invention may be practiced otherwise than as specifically described.

What is claimed is:

1. In a spin-stabilized rocket vehicle that trails slowly over toward the horizon during initial flight, said vehicle having a longitudinal axis and a plurality of rocket stages arranged in series therealong, means for activating said rocket stages in sequence, said means including a firing circuit for igniting the second one of said rocket stages, and a horizon scanner operatively connected to said firing circuit for initiating ignition of said second rocket stage, said horizon scanner being mounted at an angle to the longitudinal axis of the vehicle; whereby the horizon scanner sweeps out a cone and the earth's horizon is sensed while the vehicle is at a positive attitude with respect to the horizontal.

2. In a spin-stabilized flight vehicle adapted to be launched from an airborne aircraft, said vehicle having a plurality of rocket stages arranged in series therewithin for providing axial thrust longitudinally of the vehicle, means carried by said vehicle for activating said rocket stages in sequence, said means including means for activating the first one of said rocket stages a predetermined period of time after launch of the vehicle from the aircraft, and means on said vehicle including an infra-red horizon scanner operatively connected to said activating means for activating one of the later rocket stages.

3. In a spin-stabilized flight vehicle for putting a payload into space, said vehicle adapted to be launched from an airborne aircraft, said vehicle having a plurality of rocket stages serially arranged therewithin, activating means carried by said vehicle for sequentially igniting said rocket stages, said activating means including means for igniting the first one of said rocket stages a predetermined period of time after launch of the vehicle from the aircraft, said activating means also including means for igniting the second one of said rocket stages, and an infra-red horizon sensing mechanism mounted on said vehicle and operatively connected to said last-named means for initiating ignition of said second rocket stage.

4. In a spin-stabilized flight vehicle for putting a payload into orbit, said vehicle adapted to be launched from an airborne aircraft and trail slowly over toward the horizon during initial flight, said vehicle having a plurality of rocket motors arranged in series therewithin, activating means carried by said vehicle for igniting said rocket motors in sequence, said activating means including a first stage firing circuit for igniting the first rocket motor a predetermined period of time after launch of the vehicle from the aircraft, said activating means also including a second stage firing circuit for igniting the second rocket motor, and an infra-red horizon scanner for sensing the earth's horizon on said vehicle and operatively connected to said second stage firing circuit, said scanner operative to provide with horizon sensing a signal which is applied to said second stage firing circuit for initiating ignition of the second rocket motor.

5. The invention of claim 4, further characterized in that the vehicle has a longitudinal axis and the horizon scanner is mounted at an angle thereto; whereby during spin the scanner sweeps out a cone and the signal is applied to ignite the second rocket motor at optimum attitude of the vehicle.

6. In a system for placing a payload into orbit, in combination, a space flight vehicle having a rocket stage for providing thrust along the longitudinal axis of the vehicle, and means carried by said vehicle for igniting the rocket stage, said means including a horizon sensing mechanism for initiating ignition of said rocket stage while the vehicle is at a positive attitude with respect to the local horizontal.

7. In a system for placing a payload into orbit, in combination, a spin-stabilized flight vehicle that trails during initial flight, said vehicle having a series of rocket stages arranged to provide axial thrust longitudinally of the vehicle, and means carried by said vehicle for sequentially igniting said rocket stages, said means including a horizon sensing mechanism for initiating ignition of one of said rocket stages as the horizon is sensed while the vehicle trails toward the horizon during initial flight and the vehicle is at a positive attitude with respect to the local horizontal.

References Cited by the Examiner
UNITED STATES PATENTS

| | | | |
|---|---|---|---|
| 2,415,348 | 2/47 | Haigney | 102—50 |
| 2,963,243 | 12/60 | Rothe | 102—50 X |

OTHER REFERENCES

Stroud et al.: Scientific Uses of Earth Satellites, 1956, pp. 125–131.

Humphries: Rockets and Guided Missiles, 1956, page 151 relied on.

SAMUEL FEINBERG, *Primary Examiner.*

CHESTER L. JUSTUS, *Examiner.*